Oct. 21, 1952   R. E. IMHOFF   2,614,794
VALVE CAP CONSTRUCTION
Original Filed Aug. 23, 1947

INVENTOR.
Robert E. Imhoff
BY
Barnes, Kisselle, Laughlin & Raisch
ATTORNEYS.

Patented Oct. 21, 1952

2,614,794

UNITED STATES PATENT OFFICE 2,614,794

VALVE CAP CONSTRUCTION

Robert E. Imhoff, Detroit, Mich., assignor to Detroit Brass & Malleable Works, Detroit, Mich., a corporation of Michigan Substituted for abandoned application Serial No. 770,308, August 23, 1947. This application April 23, 1949, Serial No. 89,349

8 Claims. (Cl. 251—154)

This invention has to do with valves and it is concerned particularly with a valve construction for controlling the flow of gaseous fuel such as may be used in any kind of gas burning equipment. Of course, the valve may be used for controlling the flow of any sort of fluid, but for convenience, it may be considered herein as one for controlling gas for a gas range or hot plate or the like. This application is a substitute for abandoned application Serial No. 770,308 filed August 23, 1947.

The principal object of the invention is to provide an improved construction and particularly an improved cap construction with the view of lowering manufacturing costs so that the lower cost may be reflected in the cost to the ultimate purchaser and user, while at the same time, providing a strong rugged structure which will adequately serve the purpose for which it is intended. To this end, the construction is such that machining operations in the manufacture of the valve are minimized and the cap itself may be made of sheet or strip material which is applicable to the valve body by inter-engaging catch devices, as distinguished from screw threads or other separate attaching devices, such as screw threaded elements. A further object of the invention is to provide a cap structure applicable to the valve body in but only one position so that it cannot be wrongly assembled to the body, and thus the cap may serve, and is preferably constructed to serve, to provide limit stops for limiting the relative rotary movement of the valve elements.

A valve constructed in accordance with the invention is shown in the accompanying drawings.

Figure 1:
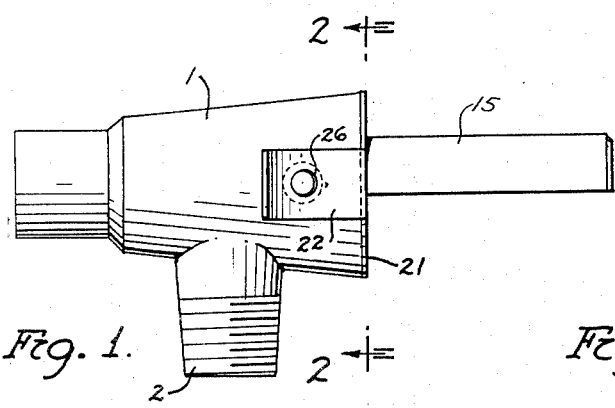
Fig. 1 is a side elevational view of a valve constructed in accordance with the invention.

As illustrated in Fig. 1, the body 1 of the valve has a threaded extension 2 for attachment to a suitable conduit, the extension having an inlet passage 3. The body has a portion 4 provided with a suitable jet orifice 5 which constitutes the outlet. The outlet structure 4 and 5 is exemplary of any one of several forms of outlet jet constructions.

Figure 3:
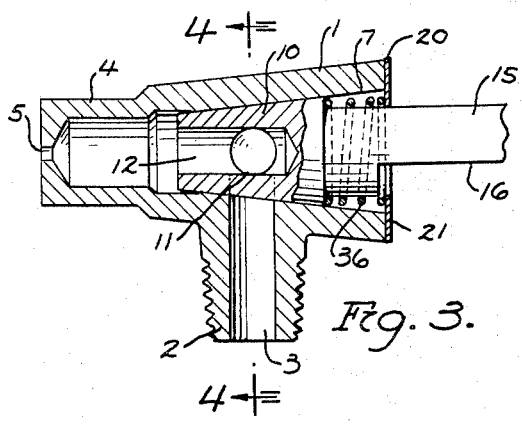
Fig. 3 is a cross sectional view taken substantially on line 3—3 of Fig. 2 showing the valve in "off" position.
Figure 4:
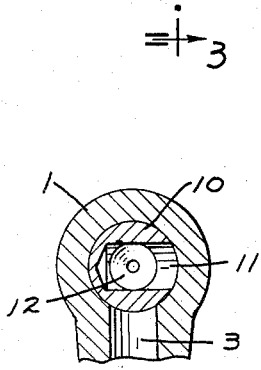
Fig. 4 is a partial section view taken on line 4—4 of Fig. 3 showing the valve in "off" position.

The body has a chamber 7 of tapered form, as shown in Fig. 3, for the reception of a tapered valve member or plug 10, which seats against the walls of the chamber. The valve member 10 has an inlet port 11 and an axial outlet passage 12. By turning the valve member in the body, the port 11 may be brought into and out of register by the inlet passage 3, while the outlet passage 12 is in communication with the hollow extension 4 and the orifice 5. In Fig. 3 the valve parts are shown in "off" position but it will be appreciated that when port 11 registers with inlet passage 3, gas may flow through the passage 3, through port 11, through port 12 and out the jet orifice 5 to a suitable gas burner. As shown in Fig. 4, the valve is in "off" position with the port 11 out of registry with the passage 3.

The valve member 10 is provided with an operating stem 15 which advantageously is cut away on one side forming a flat surface 16 and the stem is arranged to receive a suitable operating handle on its end (not shown) by means of which the valve member 10 may be turned.

The cap which is generally illustrated at 20, is formed of sheet or strip metal preferably of a metal having spring characteristics, such as a suitable spring steel. The cap has a body portion 21 designed to seat against the body 1 of the valve and it has two oppositely disposed wings 22 and 23. These wings extend from the body 21 at substantially right angles and the ends thereof are preferably flared outwardly as at 24 and 25. The wing 22 is provided with an aperture 26 and the wing 23 is provided with an aperture 27 for interengagement with lugs 28 and 29 formed integrally on the body of the valve. The lugs and their respective apertures are formed of different sizes so that the cap may be applied only in one position. As shown, the lug 28 and its cooperating aperture 26 are relatively small while the lug 29 and its cooperating aperture 27 are relatively large. The difference in the sizes are slightly exaggerated in Figs. 2 and 5 for the purpose of clarity.

Figure 5:
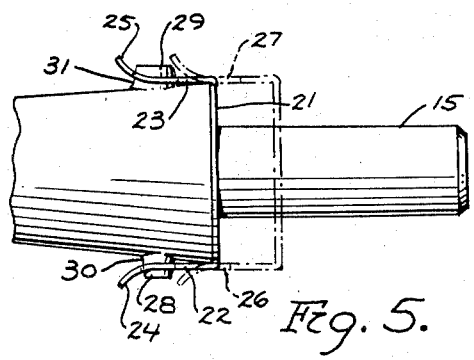
Fig. 5 is a diagrammatic view illustrating the application of the cap to the valve body.

In applying the cap to the body, the cap may be positioned as shown by the broken lines in Fig. 5 with the outwardly flared end portions 24 and 25 in a position to engage the lugs. As the cap is pushed into position, the wings are flexed with a spreading action so that they ride over the lugs and then they snap into engagement with the lug 29 engaging in the aperture 27 and the lug 28 engaging in the aperture 26. The lugs are preferably formed with inclined surfaces as shown at 30 and 31 so that as the wings 22 and 23 flex inwardly, the walls of the apertures engage the same and thus draw the body 21 of the cap tightly against the end of the valve body 1. The angularity at 30 and 31 is preferably within the angle of repose of the metals involved so that there is a positive lock and so that any outward force on the cap does not tend to cam the wings 22 and 23 outwardly in a tendency to disengage the lugs.

Figure 2:
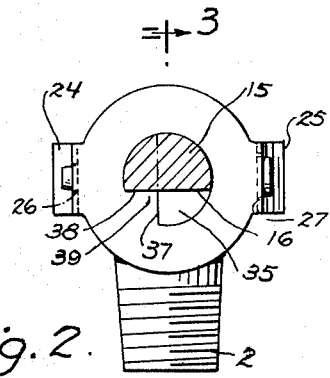
Fig. 2 is a view showing the stem in cross section and taken substantially on line 2—2 of Fig. 1.

The body of the cap is provided with an aperture 35 through which the stem 15 extends and a coil spring 36 is disposed in the chamber 7 between the cap and the valve member 10 to thus hold the tapered valve member on its seat. The aperture 35 is formed so as to leave a segment 39 having a stop face 37 and a stop face 38 for cooperation with the flat surface 16 of the stem. In Fig. 2, it will be noted that the flat surface 16 of the stem engages the stop face 38 of the segment. This limits the movement of the valve member in one direction and this may be the "off" position as shown in Fig. 4. When the valve member is turned approximately 90° clockwise, as Fig. 2 is viewed, to the "on" position, the face 16 of the stem contacts the stop face 37 of the segment. Thus, it is important that the cap be applied to the body in only one position to thus properly locate the segment 39, so that when the assembly is made, the valve will surely operate to properly align and disalign the port 11 with the inlet passage 3.

In the making of the cap, it may be formed from the sheet or strip metal by suitable stamping and/or forming dies with the aperture 35 cut therein leaving the segment 39 and with the wings 22 and 23 bent into proper position relative to the body 21. The apertures 26 and 27 may be formed while the sheet stock is in the flat and then the wings 22 and 23 may subsequently be fashioned angularly relative to the body and bent to form the curved end portions 34 and 35. After the cap is thus formed from sheet material, it is preferably heat treated to insure the proper yielding or spring action of the wings 22 and 23. It will be rather obvious how the cap may be removed from the body in the event it is necessary to take the valve apart for any reason, by engaging the curved end portions 24 and 25 and spreading the wings to disengage the lugs.

I claim:

1. A valve construction having a body member and a valve member rotatably disposed relative to the body member, the valve member having an operating stem, said members having passages some of which are arranged to be brought into and out of registry by rotary movement of the valve member, a pair of lugs on the body member projecting from substantially opposite sides thereof, a cap comprised of sheet-like metal having a body part and two oppositely disposed wings extending from the body part substantially perpendicularly and overlying opposite sides of the body member, the body part having an opening through which the operating stem extends, said wings each having an opening therein engaged respectively with said lugs on the body.

2. A valve construction having a body member with a valve chamber therein and a valve member rotatably positioned in the chamber, said members having passages some of which are arranged to be brought into and out of registry by the rotary movement of the valve member, said valve member having an operating stem which projects from the chamber, a pair of lugs on the body member projecting substantially from opposite sides thereof, a cap having a body part for closing the valve chamber of the body member, the body part having an opening through which the operating stem extends, said cap having two oppositely disposed wings extending from the body part substantially perpendicularly and overlying opposite sides of the body member, said wings each having an aperture therein engaged respectively with said lugs on the body, and a spring positioned in the chamber acting on the valve member to seat the same in the chamber and reacting against the body part of the cap.

3. A valve construction having a body member with a valve chamber therein and a valve member rotatably positioned in the chamber, said members having passages some of which are arranged to be brought into and out of registry by the rotary movement of the valve member, said valve member having an operating stem which projects from the chamber, a pair of lugs on the body member projecting substantially from opposite sides thereof, a cap having a body part for closing the valve chamber of the body member, the body part having an opening through which the operating stem extends, said cap having two oppositely disposed wings extending from the body part substantially perpendicularly and overlying opposite sides of the body member, said wings each having an aperture therein engaged respectively with said lugs on the body, and a spring positioned in the chamber acting on the valve member to seat the same in the chamber and reacting against the body part of the cap, stop elements integrally formed on the cap and face means on the stem for engaging the stop elements for limiting the rotary action of the valve member.

4. A valve construction having a body member and a valve member rotatably disposed relative to the body member, the valve member having an operating stem, said members having passages some of which are arranged to be brought into and out of registry by rotary movement of the valve member, a pair of lugs on the body member projecting from substantially opposite sides thereof, a cap comprised of a single piece of sheet-like metal having spring characteristics and having a body part and two oppositely disposed wings extending from the body part substantially perpendicularly, the body part having an opening through which the operating stem extends, said wings overlying opposite sides of the body member, said wings each having an aperture therein engaged respectively with the lugs on the body.

5. The valve construction as recited in claim 4, characterized in that the ends of the wings are flared outwardly and adapted to be pushed over the lugs by being engaged on the flared ends and to snap into position with the apertures fitting over the lugs.

6. The valve construction as recited in claim 4, characterized in that the ends of the wings are flared outwardly and are adapted to snap over the lugs and further characterized in that surfaces of the lugs are tapered so that when the said apertures engage the tapered surfaces of the lugs, the body part of the cap is held against the body member of the valve.

7. A cap for a valve having a valve body and a valve member with an operating stem, the valve body having a pair of substantially oppositely extending lugs comprising, a single piece of sheet-like spring metal having a body part constituting a closure cap and a pair of oppositely disposed wings projecting from the body part substantially perpendicularly, the body part having an aperture for the said stem, each wing having an opening therein adapted to engage with its respective lug on the valve body.

8. A cap for a valve having a valve body and a valve member with an operating stem, the valve body having a pair of substantially oppositely extending lugs comprising, a body part of sheet-like metal constituting a closure cap, and a pair of substantially oppositely disposed wings projecting from the body part substantially perpendicularly, the body part having an aperture for the said stem, said wings adapted to embrace opposite sides of the valve body and each having an aperture therein for respective engagement with the lugs on the body.

ROBERT E. IMHOFF.

REFERENCES CITED

The following references are of record in the file of this patent:

UNITED STATES PATENTS

| Number | Name | Date |
|---|---|---|
| 1,921,779 | Roberts | Aug. 8, 1933 |
| 1,954,217 | Morrow | Apr. 10, 1934 |
| 2,118,232 | Roberts | May 24, 1938 |

FOREIGN PATENTS

| Number | Country | Date |
|---|---|---|
| 573,781 | France | of 1924 |
| 720,597 | France | of 1932 |